United States Patent
Sunaga et al.

[11] Patent Number: 5,956,959
[45] Date of Patent: Sep. 28, 1999

[54] REFRIGERANT COMPRESSOR AND COOLING APPARATUS COMPRISING THE SAME

[75] Inventors: Takashi Sunaga; Masato Watanabe; Kazuhisa Ishikawa; Kenji Ando, all of Gunma-ken; Masazo Okajima, Tochigi-ken; Yoshinobu Obokata; Yasuki Takahashi, both of Gunma-ken, all of Japan

[73] Assignee: Sanyo Electric Co., Ltd., Osaka-fu, Japan

[21] Appl. No.: 08/939,667

[22] Filed: Sep. 29, 1997

[30] Foreign Application Priority Data

Sep. 30, 1996 [JP] Japan .................................. 8-259641

[51] Int. Cl.$^6$ ...................................................... F25B 41/00
[52] U.S. Cl. ............................................................... 62/114
[58] Field of Search ........................... 252/68, 67; 62/114

[56] References Cited

U.S. PATENT DOCUMENTS 5,454,963  10/1995  Kaneko ..................................... 252/52

FOREIGN PATENT DOCUMENTS

| 509673 | 10/1992 | European Pat. Off. . |
| 0644175 | 3/1995 | European Pat. Off. . |
| 715079 | 6/1996 | European Pat. Off. . |
| 732391 | 9/1996 | European Pat. Off. . |
| 1271491 | 10/1989 | Japan . |
| 6295357 | 10/1994 | Japan . |
| WO 9728236 | 8/1997 | WIPO . |

OTHER PUBLICATIONS

*Database WPI*, Section Ch, Week 9431, Derwent Publications Ltd., London, GB; Class A97, An 94–253117 XP002055222 & JP 06 184 575 A (Tonen Corp), Jul. 5, 1994.

*Primary Examiner*—Henry Bennett
*Assistant Examiner*—Malik N. Drake
*Attorney, Agent, or Firm*—Weingarten, Schurgin, Gagnebin & Hayes LLP

[57] ABSTRACT

A refrigerant compressor is configured such that a compressor unit is installed in a hermetically sealed container, an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula (1):

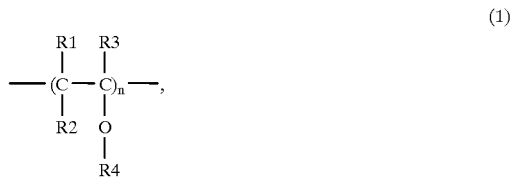

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%. As a result, the generation of a carboxylic acid caused by thermal cracking or hydrolysis due to frictional heat generated by sliding members is prevented and the generation of sludge is thereby suppressed.

20 Claims, 4 Drawing Sheets

REFRIGERANT COMPRESSOR AND COOLING APPARATUS COMPRISING THE SAME

BACKGROUND OF THE INVENTION

1. Field of the Invention

This invention relates to a refrigerant compressor which uses 1,1,1,2-tetrafluoroethane (to be referred to as R134a hereinafter) which is an HFC type refrigerant or a mixture of HFC type refrigerants (such as a mixture of R134a, R32 and R125, a mixture of R134a, R143a and R125 or a mixture of R32 and R125) as a refrigerant and a refrigerator oil having compatibility with the refrigerant and to a cooling apparatus.

2. Background Art

Most refrigerant compressors for refrigerators, automatic vending machines and show cases have conventionally used dichlorodifluoromethane (to be referred to as R12 hereinafter) as a refrigerant. This R12 falls under flon regulations because of the disruption of the ozone layer. R134a is now being studied for use in refrigerators as a substitute for this R12 (refer to Laid-open Japanese Patent Application No. Hei 1-271491, for example).

Although chlorodifluoromethane (R22) has been used in air conditioners and the like, much attention is paid to HFC type mixed refrigerants from a viewpoint of environmental preservation.

However, HFC type refrigerants such as the above-described R134a have poor compatibility with a refrigerator oil such as mineral oil or alkylbenzene oil which is currently used and cause a failure in lubricating the compressor due to the bad returning of the oil to the compressor and the absorption of the separated refrigerant at the time of activation.

Therefore, the inventors of the present invention have studied a polyol ester type oil as a refrigerator oil which has compatibility with HFC type refrigerants such as R134a. However, when this polyol ester type oil is used in a rotary type compressor, a fatty acid produced by the hydrolysis of the oil caused by heat corrodes sliding members and causes wear. Powders produced by this wear exert a bad influence on organic materials such as magnet wires of electric elements of the compressor and thus impair the durability of the compressor.

The inventors have conducted studies to use a combination of an HFC type refrigerant as a refrigerant and a polyol ester type oil as a refrigerator oil in a rotary type compressor and have found that a carboxylic acid which is produced by the hydrolysis of the polyol ester type oil for lubricating sliding members caused by the frictional heat of the sliding members of the rotary type compressor corrodes iron type materials or reacts with iron type materials to become metal soap or sludge, thereby reducing refrigerating capacity.

As a result, the inventors have found that the thermal cracking of the polyol ester type oil caused by frictional heat generated by the sliding members can be suppressed by a combination of a specific polyol ester type oil, a specific additive and a specific sliding material (refer to Laid-open Japanese Patent Application No. Hei 6-295357).

However, according to the above technique, it is necessary to strictly control the production process, that is, the concentrations of water, chlorine and oxygen, in order to suppress hydrolysis when the polyol ester type oil is used. Therefore, the above invention has a problem that control is troublesome.

SUMMARY OF THE INVENTION

It is an object of the present invention which has been made to solve the above problem to provide a high-performance refrigerant compressor which uses a polyvinyl ether type oil having compatibility with an HFC type refrigerant such as R134a as a refrigerator oil to suppress the production of a carboxylic acid caused by thermal cracking or hydrolysis due to the frictional heat of sliding members and the generation of a sludge caused thereby without carrying out troublesome process control.

According to a first aspect of the present invention, there is provided a refrigerant compressor comprising a hermetically sealed container and a compressor unit installed in the hermetically sealed container, wherein an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula (1):

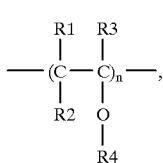

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

According to a second aspect of the present invention, there is provided a refrigerant compressor in which the refrigerant is selected from the group consisting of 1,1,1,2-tetrafluoroethane (R134a), an azeotropic mixed refrigerant consisting of 50 wt % of difluoromethane (R32) and 50 wt % of pentafluoroethane (R125), and a pseudo-azeotropic mixed refrigerant consisting of 44 wt % of pentafluoroethane (R125), 52 wt % of trifluoroethane (R143a) and 4 wt % of 1,1,1,2-tetrafluoroethane (R134a).

According to a third aspect of the present invention, there is provided a refrigerant compressor in which the refrigerator oil comprises 0.01 to 1.0 wt % of a phenolic antioxidant as an essential component and 0.01 to 2 wt % of an epoxy type or carbodiimide type compound.

According to a fourth aspect of the present invention, there is provided a refrigerant compressor in which the refrigerator oil comprises 0.1 to 2 wt % of a phosphoric ester type compound.

According to a fifth aspect of the present invention, there is provided a refrigerant compressor in which the compressor unit comprises a vane made from an iron type material or a carbon composite material infiltrated with aluminum and a roller made from an iron type material.

According to a sixth aspect of the present invention, there is provided a refrigerant compressor in which the compressor unit comprises a vane made from an iron type material such as high speed tool steel or an SUS type material subjected to a single or composite surface treatment by ion nitridation, nitrosulphurization or CrN.

According to a seventh aspect of the present invention, there is provided a refrigerant compressor in which the units in which R4 is an alkyl group having 1 to 2 carbon atoms are 80 to 100% and the units in which R4 is an alkyl group having 3 to 4 carbon atoms are 0 to 20%.

According to an eighth aspect of the present inventing, there is provided a refrigerant compressor in which the refrigerant comprises at least two compositions selected from the group consisting of fluorinated hydrocarbons represented by the following general formula (2):

$$C_l H_m F_n \qquad (2)$$

(wherein when l=1, m=1~2, n=2~3 and m+n=4, when l=2, m=1~4, n=2~5 and m+n=6, and when l=3, m 1~3, n=5~7 and m+n=8).

According to a ninth aspect of the present invention, there is provided a refrigerant compressor in which the refrigerant is selected from the group consisting of an azeotropic mixed refrigerant consisting of 50 wt % of difluoromethane (R32) and 50 wt % of pentafluoroethane (R125) and a pseudo-azeotropic mixed refrigerant consisting of 44 wt % of pentafluoroethane (R125), 52 wt % of trifluoroethane (R143a) and 4 wt % of 1,1,1,2-tetrafluoroethane (R134a).

According to a tenth aspect of the present invention, there is provided a refrigerant compressor in which the refrigerator oil comprises 0.01 to 1.0 wt % of a phenolic antioxidant as an essential component and 0.01 to 2 wt % of an epoxy type or carbodiimide type compound.

According to an eleventh aspect of the present invention, there is provided a refrigerant compressor in which the refrigerator oil comprises 0.1 to 2 wt % of a phosphoric ester type compound.

According to a twelfth aspect of the present invention, there is provided a refrigerant compressor in which the compressor unit comprises a vane made from an iron type material or a carbon composite material infiltrated with aluminum and a roller made from an iron type material.

According to a thirteenth aspect of the present invention, there is provided a refrigerant compressor in which the compressor unit comprises a vane made from an iron type material such as high speed tool steel or an SUS type material subjected to a single or composite surface treatment by ion nitridation, nitrosulphurization or CrN.

According to a fourteenth aspect of the present invention, there is provided a refrigerant compressor in which the units in which R4 is an alkyl group having 1 to 2 carbon atoms are 60 to 100% and the units in which R4 is an alkyl group having 3 to 4 carbon atoms are 0 to 40%.

According to a fifteenth aspect of the present invention, there is provided a refrigerant compressor in which the refrigerant comprises at least two compositions selected from the group consisting of fluorinated hydrocarbons represented by the following general formula (2):

$$C_l H_m F_n \qquad (2)$$

(wherein when l=1, m=1~2, n=2~3 and m+n=4, when l=2, m=1~4, n=2~5 and m+n=6, and when l=3, m=1~3, n=5~7 and m+n=8).

According to a sixteenth aspect of the present invention, there is provided a refrigerant compressor in which the refrigerant is a pseudo-azeotropic mixed refrigerant consisting of 23 wt % of difluoromethane (R32), 25 wt % of pentafluoroethane (R125) and 52 wt % of 1,1,1,2-tetrafluoroethane (R134a).

According to a seventeenth aspect of the present invention, there is provided a refrigerant compressor in which the refrigerator oil comprises 0.01 to 1.0 wt % of a phenolic antioxidant as an essential component and 0.01 to 2 wt % of an epoxy type or carbodiimide type compound.

According to an eighteenth aspect of the present invention, there is provided a refrigerant compressor in which the refrigerator oil comprises 0.1 to 2 wt % of a phosphoric ester type compound.

According to a nineteenth aspect of the present invention, there is provided a refrigerant compressor in which the compressor unit comprises a vane made from an iron type material or a carbon composite material infiltrated with aluminum and a roller made from an iron type material.

According to a twentieth aspect of the present invention, there is provided a refrigerant compressor in which the compressor unit comprises a vane made from an iron type material such as high speed tool steel or an SUS type material subjected to a single or composite surface treatment by ion nitridation, nitrosulphurization or CrN.

According to a twenty-first aspect of the present invention, there is provided a cooling apparatus comprising a refrigerant compressor comprising a hermetically sealed container and a compressor unit installed in the hermetically sealed container, a condenser, an expansion device and an evaporator, which are connected by pipes, wherein an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula

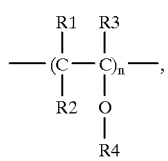

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

The present invention is described hereinafter with reference to embodiments shown in the accompanying drawings.

Figure 1:
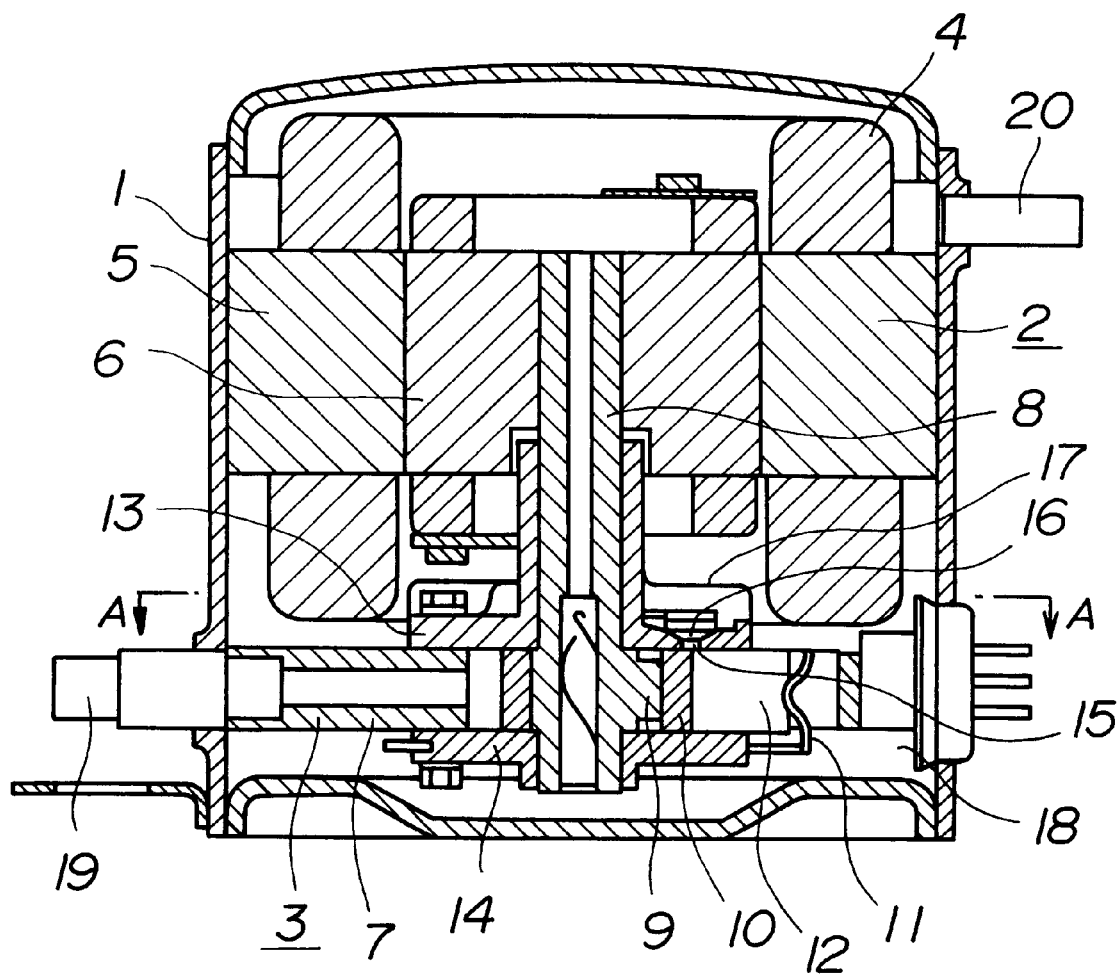
FIG. 1 is a longitudinal sectional view of a rotary type compressor according to an embodiment of the present invention.
Figure 2:
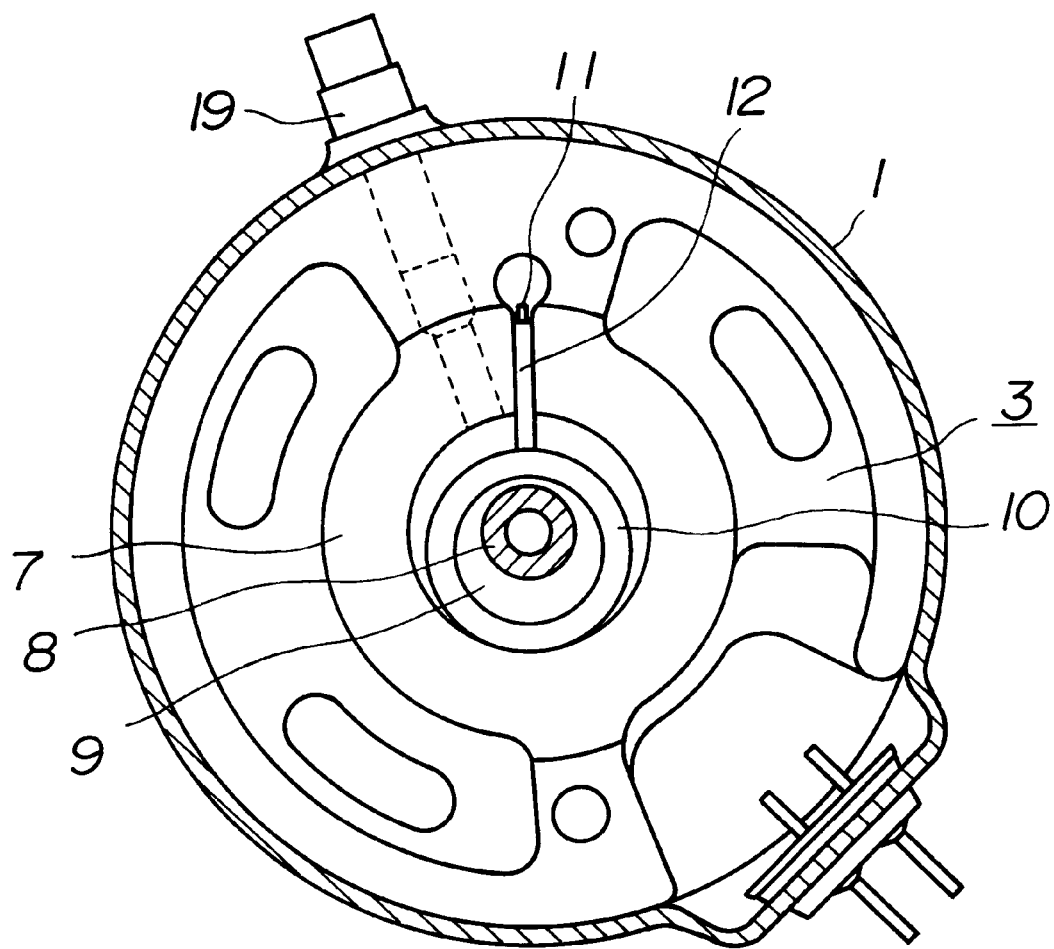
FIG. 2 is a transverse sectional view of a rotary type compressor of the present invention.

FIG. 1 is a longitudinal sectional view of a rotary type compressor. FIG. 2 is a sectional view cut on line A—A of the rotary type compressor of FIG. 1. In FIGS. 1 and 2, reference numeral 1 denotes a hermetically sealed container in which an electric element 2 and a rotary compression element 3 driven by this electric element as a compressor unit are installed in the container in such a manner that the electric element 2 is positioned above the rotary compression element 3. The electric element 2 comprises a stator 5 having a coil 4 insulated by an organic material and a rotor 6 arranged inside the stator. The rotary compression element 3 comprises a cylinder 7, a roller 10 which is turned along the interior wall of the cylinder 7 by an eccentric portion 9 of a rotary shaft 8, a vane 12 pressed by a spring 11 for partitioning the inside of the cylinder 7 into a suction side and a discharge side when it is pressure contacted to the peripheral surface of the roller, and an upper bearing 13 and a lower bearing 14 for supporting the rotary shaft 8 and closing the openings of the cylinder 7.

A discharge port 15 communicating with the discharge side of the cylinder 7 is formed in the upper bearing 13. A discharge valve 16 for opening and closing the discharge port 15 and an exhaust muffler 17 for covering the discharge valve are attached to the upper bearing 13.

The roller 10 is formed from an iron type material such as cast iron as will be described hereinafter, the vane 12 is formed from an iron type material, a composite material of aluminum and carbon, or an iron type material such as high speed tool steel or an SUS type material subjected to a single or composite surface treatment by ion nitridation, nitrosulphurization, CrN or the like.

An HFC type refrigerant or a mixture thereof is charged into a bottom portion of the hermetically sealed container 1. The refrigerant is 1,1,1,2-tetrafluoroethane (R134a) alone, an azeotropic mixed refrigerant (to be referred to as R410A hereinafter) consisting of 50 wt % of difluoromethane (R32) and 50 wt % of pentafluoroethane (R125), a pseudo-azeotropic mixed refrigerant (to be referred to as R404A hereinafter) consisting of 44 wt % of pentafluoroetane (R125), 52 wt % of trifluoroethane (R143a) and 4 wt % of 1,1,1,2-tetrafluoroethane (R134a), or a pseudo-azeotropic mixed refrigerant (to be referred to as R407C hereinafter) consisting of 23 wt % of difluoromethane (R32), 25 wt % of pentafluoroethane (R125) and 52 wt % of 1,1,1,2-tetrafluoroethane (R134a).

Oil used as the refrigerator oil has compatibility with the above refrigerant.

Stated more specifically, the refrigerator oil essentially comprises a polyvinyl ether type compound having structural units represented by the following general formula

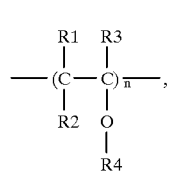

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%. Or the refrigerator oil essentially comprises a polyvinyl ether type compound having structural units represented by the above general formula (1), in which the units in which R4 is an alkyl group having 1 to 2 carbon atoms are 40 to 100% and the units in which R4 is an alkyl group having 3 to 4 carbon atoms are 0 to 60%. In addition, the refrigerator oil essentially comprises a polyvinyl ether type compound having structural units represented by the above general formula (1), in which the units in which R4 is an alkyl group having 1 to 2 carbon atoms are 40 to 100% and the units in which R4 is an alkyl group having 3 to 4 carbon atoms are 0 to 60% As an antioxidant, 0.01 to 1.0 wt % of a phenolic antioxidant (such as DBPC) is contained as an essential component and 0.01 to 2 wt % of an epoxy type or carbodiimide type compound is contained as an acid trapping agent in the refrigerator oil.

As an extreme-pressure additive or an anti-wear agent, 0.1 to 2 wt % of a phosphoric ester type compound such as tricresyl phosphate (TCP) is contained in the refrigerator oil.

Glycidyl ether which is one of epoxy type compounds is selected from the group consisting of hexylglycidyl ether, 2-ethylhexylglycidyl ether and isooctadecylglycidyl ether.

The above carbodiimide type compounds are represented by the general formula R5—N=C=N—R6 wherein R5 and R6 are each selected from an alkyl group and an alkyl-substituted aromatic group.

The oil 18 lubricates a sliding surface between the roller 10 and the vane 12 which are the sliding members of the rotary compression element 3.

The refrigerant which flows into the cylinder 7 of the rotary compression element 3 and is compressed by cooperation between the roller 10 and the vane 12 is R134a, R410A, R407C or R404A having compatibility with the polyvinyl ether type oil 18 as described above.

Reference numeral 19 denotes a suction pipe, attached to the hermetically sealed container 1, for guiding the refrigerant to the suction side of the cylinder 7 and 20 a discharge pipe, attached to the upper wall of the hermetically sealed container 1, for discharging the refrigerant compressed by the rotary compression element 3 to the outside of the hermetically sealed container 1 through the electric element 2.

In the above configured rotary compressor using the refrigerator oil composition, the refrigerant flowing into the suction side of the cylinder 7 from the suction pipe 19 is compressed by cooperation between the roller 10 and the vane 12, passes through the discharge port 15 to open the discharge valve 16 and is discharged into the exhaust muffler 17. The refrigerant in this exhaust muffler is discharged from the discharge pipe 20 to the outside of the hermetically sealed container 1 through the electric element 2. The oil 18 is supplied to the sliding surface between the sliding members such as the roller 10 and the vane 12 of the rotary compression element 3 to lubricate the surface. The refrigerant compressed in the cylinder 7 is prevented from being leaked into a low-pressure side.

The following examples and comparative examples are given to further illustrate the present invention.

Figure 3:
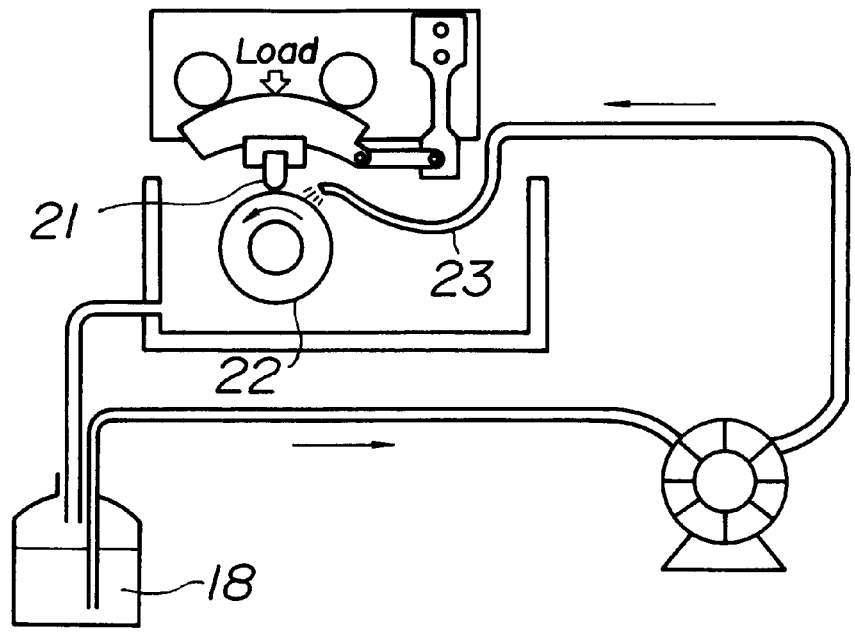
FIG. 3 is a diagram for explaining an Amsler wear tester.

FIG. 3 is a diagram for explaining a wear test which has been conducted using an Amsler wear tester.

In this respect, reference numeral 21 denotes a fixed piece equivalent to the vane and having a curved end with a radius of 4.7 mm, which receives a load L of 100 kg. Reference numeral 22 represents a rotating piece equivalent to the roller and having a diameter of 45 mm. This rotating piece is turned at a speed of 400 rpm for 20 hours while a pressure contact portion thereof with the fixed piece 21 is supplied with various polyvinyl ether type oils at a rate of 120 cc/min.

Table 1 shows the results of abrasion tests made on the following combinations using the Amsler abrasion tester shown in FIG. 3.

TABLE 1

| Vane Material | Structure of Polyvinyl Ether (R4) | Total Acid Number (TAN) | Wear Quantity of Test Sample | |
|---|---|---|---|---|
| | | | Vane 0.1x (mm) | Roller ($\mu$m) |
| Comparative Example | Type A | 0.09 | 0.7 | −3 |
| Example 1 | Type A | 0.01 | 0.6 | −1 |
| Example 2 | Type A | not more than 0.01 | 0.1 | 0 |
| Example 3 | Type A | not more than 0.01 | 0.1 | 0 |
| Example 4 | Type A | not more than 0.01 | 0.1 | 0 |

[VANE]
Comparative Example: high speed tool steel (SKH51)
  composition : C: 0.8 to 0.9, Si: not more than 0.4, Mn: not more than 0.4, P: not more than 0.03, S: not more than 0.03, Cr; 3.8 to 4.5, Mo: 4.5 to 5.5, W: 5.5 to 6.7, V: 1.6 to 2.2, Cu: not more than 0.25, Ni: not more than 0.25
Example 1: composite material comprising aluminum and carbon; stated specifically, carbon composite material infiltrated with aluminum (Carbon AL)
  composition: C: 55, Al: 36, Si: 6, others (such as Mg): 3 (in wt %)
Example 2: iron type material such as high speed tool steel which is subjected to a surface treatment by nitrosulphurization; stated specifically, a material equivalent to SKH55 containing the following components and subjected to a surface treatment by plasma nitrosulphurization
  composition: C: 2.14, Si: 0.32, Cr: 4.21, Mn: 0.32, W: 11.5, V: 7.0, Co: 8.0, Mo: 2.53, Fe: the balance (in wt %)
Example 3: SUS type material subjected to a surface treatment by nitrosulphurization; stated specifically, SUS440 type material containing the following components and subjected to a surface treatment by plasma nitrosulphurization
  composition: C: 1.8 to 2.3, Si: not more than 1, Cr: 20 to 24, Mo: 0.5 to 2.6, Fe: the balance (in wt %)
Example 4: iron type material such as high speed tool steel subjected to a surface treatment by ion nitridation and further a surface treatment by CrN
[ROLLER] cast iron material (to be referred to as E-3 hereinafter)
  composition: T.C.(total carbon): 0.56 to 0.64, Si: 2.2 to 2.9, Mn: 0.6 to 1.0, P: 0.18 max, S: 0.08 max, Ni: 0.1 to 0.2, Cr: 0.20 max, Mo: 0.07 to 0.2, Ti: 0.25 max, Fe: the balance
[OIL] oil essentially comprising a polyvinyl ether type compound having structural units represented by the following general formula (1):

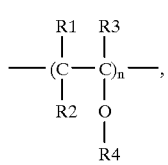

(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 50% and units in which R4 is an alkyl group having 3 to 4 carbon atoms are 50%, and further comprising 0.1 to 2.0 wt % of tricresyl phosphate (TCP) and 0.01 to 10 wt % of 2-ethylhexylglycidyl ether as the epoxy compound according to the present invention (EPOX) (to be referred to as "Type A" hereinafter).
[REFRIGERANT] R134a alone As a result, as shown in Table 1, it was confirmed that the vane materials of Examples 1 to 3 are all superior in total acid number (TAN) and wear quantity of TP.

It is assumed that the reason for this is the thermal cracking of the polyvinyl ether type oil caused by sliding frictional heat generated on the sliding surface between the rotating piece 22 and the fixed piece 21 was suppressed.

Table 2 shows the results of wear tests on the following combinations using an Amsler wear tester shown in FIG. 3.

TABLE 2

| Vane Material | Structure of Polyvinyl Ether (R4) | Total Acid Number (TAN) | Wear Quantity of Test Sample | |
|---|---|---|---|---|
| | | | Vane 0.1x (mm) | Roller ($\mu$m) |
| Comparative Example | Type C | 0.08 | 0.6 | −3 |
| Example 1 | Type C | 0.01 | 0.5 | −1 |
| Example 2 | Type C | not more than 0.01 | 0.1 | 0 |
| Example 3 | Type C | not more than 0.01 | 0.1 | 0 |
| Example 4 | Type C | not more than 0.01 | 0.1 | 0 |

[VANE]
Comparative Example: high speed tool steel (SKH)
Example 1: composite material comprising aluminum and carbon; stated specifically, carbon composite material infiltrated with aluminum (Carbon AL) composition: C: 55, Al: 36, Si: 6, others (such as Mg): 3 (in wt %)
Example 2: iron type material such as high speed tool steel subjected to a surface treatment by nitrosulphurization; stated specifically, HAP 63 material (equivalent to SKH54) containing the following components and subjected to a surface treatment by plasma nitrosulphurization
  composition: C: 2.14, Si: 0.32, Cr: 4.21, Mn: 0.32, W: 11.5, V: 7.0, Co: 8.0, Mo: 2.53, Fe: the balance (in wt %)
Example 3: SUS type material subjected to a surface treatment by nitrosulphurization; stated specifically, SUS440 type material containing the following components and subjected to a surface treatment by plasma nitrosulphurization
  composition: C: 1.8 to 2.3, Si: not more than 1, Cr: 20 to 24, Mo: 0.5 to 2.6, Fe: the balance (in wt %)
Example 4: iron type material such as high speed tool steel subjected to a surface treatment by ion nitridation and further to a surface treatment by CrN
[ROLLER] cast iron material (to be referred to as E-3 hereinafter)
  composition: T. C. (total carbon): 0.56 to 0.64, Si: 2.2 to 2.9, Mn: 0.6 to 1.0, P: 0.18 max, S: 0.08 max, Ni: 0.1 to 0.2, Cr: 0.20 max, Mo: 0.07 to 0.2, Ti: 0.25 max

[OIL] oil essentially comprising a polyvinyl ether type compound having structural units represented by the following general formula (1):

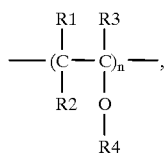

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 80% and units in which R4 is an alkyl group having 3 to 4 carbon atoms are 20%, and further comprising 0.1 to 2.0 wt % of tricresyl phosphate (TCP) and 0.01 to 10 wt % of 2-ethylhexylglycidyl ether as the epoxy compound according to the present invention (EPOX) (to be referred to as "Type C" hereinafter)

[REFRIGERANT] R410A or R404A

As a result, as shown in Table 2, it was confirmed that the vane materials of Examples 1 to 3 are all superior in total acid number (TAN) and wear quantity of TP.

It is assumed that the reason for this is the thermal cracking of the polyvinyl ether type oil caused by sliding frictional heat generated on the sliding surface between the rotating piece 22 and the fixed piece 21 was suppressed. It is also considered that the deterioration of the oil is caused by the suppression of a catalytic function due to the ineffectiveness of iron by TCP.

Table 3 shows the results of wear tests on the following combinations using an Amsler wear tester shown in FIG. 3.

TABLE 3

| Vane Material | Structure of Polyvinyl Ether (R4) | Total Acid Number (TAN) | Wear Quantity of Test Sample | |
|---|---|---|---|---|
| | | | Vane 0.1x (mm) | Roller (μm) |
| Comparative Example | Type B | 0.07 | 0.5 | −2 |
| Example 1 | Type B | not more than 0.01 | 0.5 | 0 |
| Example 2 | Type B | not more than 0.01 | 0.2 | −1 |
| Example 3 | Type B | not more than 0.01 | 0.2 | −1 |
| Example 4 | Type B | not more than 0.01 | 0.1 | 0 |

[VANE]

Comparative Example: high speed tool steel (SKH)

Example 1: composite material comprising aluminum and carbon; stated specifically, carbon composite material infiltrated with aluminum (Carbon AL) composition: C: 55, Al: 36, Si: 6, others (such as Mg): 3 (in wt %)

Example 2: iron type material such as high speed tool steel subjected to a surface treatment by nitrosulphurization; stated specifically, HAP63 material (equivalent to SKH54) containing the following components and subjected to a surface treatment by plasma nitrosulphurization composition: C: 2.14, Si: 0.32, Cr: 4.21, Mn: 0.32, W: 11.5, V: 7.0, Co: 8.0, Mo: 2.53, Fe: the balance (in wt %)

Example 3: SUS type material subjected to a surface treatment by nitrosulphurization; stated specifically, SUS440 type material containing the following components and subjected to a surface treatment by plasma nitrosulphurization composition: C: 1.8 to 2.3, Si: not more than 1, Cr: 20 to 24, Mo: 0.5 to 2.6, Fe: the balance (in wt %)

Example 4: iron type material such as high speed tool steel subjected to a surface treatment by ion nitridation and further to a surface treatment by CrN

[ROLLER] cast iron material (to be referred to as E-3 hereinafter)

composition: T. C. (total carbon): 0.56 to 0.64, Si: 2.2 to 2.9, Mn: 0.6 to 1.0, P: 0.18 max, S: 0.08 max, Ni: 0.1 to 0.2, Cr: 0.20 max, Mo: 0.07 to 0.2, Ti: 0.25 max, Fe: the balance

[OIL] oil essentially comprising a polyvinyl ether type compound having structural units represented by the following general formula (1):

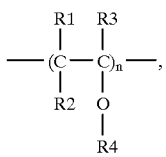

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 70% and units in which R4 is an alkyl group having 3 to 4 carbon atoms are 30%, and further comprising 0.1 to 2.0 wt % of tricresyl phosphate (TCP) and 0.01 to 10 wt % of 2-ethylhexylglycidyl ether as the epoxy compound according to the present invention (EPOX) (to be referred to as "Type B" hereinafter)

[REFRIGERANT] R407C

As a result, as shown in Table 3, it was confirmed that the vane materials of Examples 1 to 3 are all superior in total acid number (TAN) and wear quantity of TP.

It is assumed that the reason for this is the thermal cracking of the polyvinyl ether type oil caused by sliding frictional heat generated on the sliding surface between the rotating piece 22 and the fixed piece 21 was suppressed. It is also considered that the deterioration of the oil is caused by the suppression of a catalytic function due to the ineffectiveness of iron by TCP.

Figure 4:
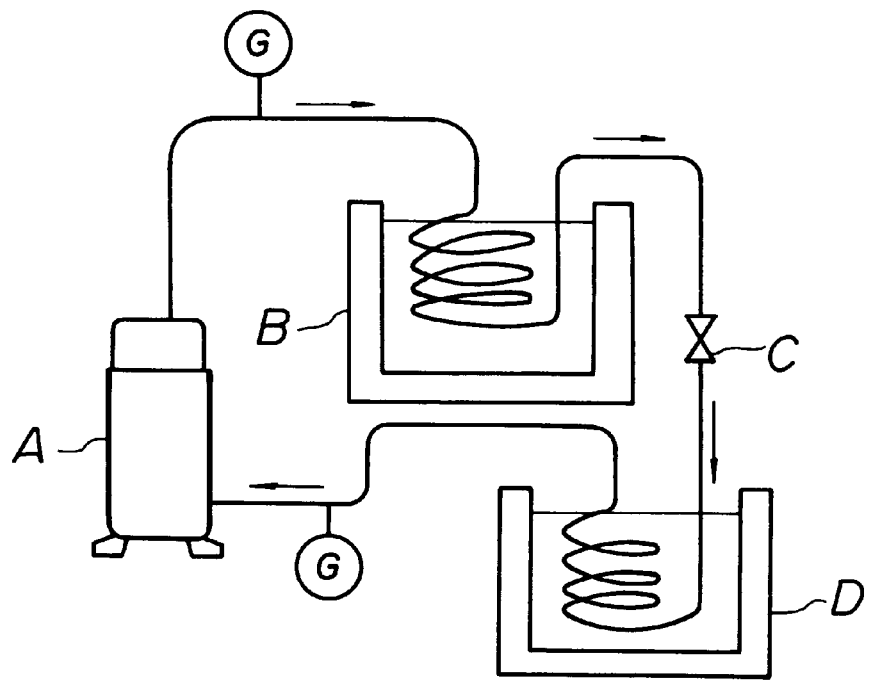
FIG. 4 is a diagram for explaining a bench-stand tester.

Table 4 shows the results of a durability test on an actual refrigerant compressor comprising the following elements using a bench-stand tester shown in FIG. 4 based on the evaluations of Tables 1, 2 and 3.

The bench-stand tester comprises a compressor A, condenser B, expansion valve C and evaporator D all of which are connected by pipes and test conditions are as follows:

Pressure at High Level: 27 to 28 kg/cm$^2$.G,
Pressure at Low Level: 46 kg/cm$^2$.G,
Operation Frequency: 100 Hz,
Operation Time: 1,000 hr,
Refrigerant: R134a, R410A, R404A, R407C
Temperature of Upper Portion of Case: 95 to 100° C. Each material is as follows:

[VANE]

Comparative Example 4: high speed tool steel (SKH)

Example 1: composite material comprising aluminum and carbon; stated specifically, carbon composite material infiltrated with aluminum (Carbon AL)

composition: C: 55, Al: 36, Si: 6, others (such as Mg): 3 (in wt %)

Example 2: iron type material such as high speed tool steel subjected to a surface treatment by nitrosulphurization; stated specifically, HAP63 material (equivalent to SKH54) containing the following components and subjected to a surface treatment by plasma nitrosulphurization composition: C: 2.14, Si: 0.32, Cr: 4.21, Mn: 0.32, W: 11.5, V: 7.0, Co: 8.0, Mo: 2.53, Fe: the balance (in wt %)

Example 3: SUS type material subjected to a surface treatment by nitrosulphurization; stated specifically, SUS440 type material containing the following components and subjected to a surface treatment by plasma nitrosulphurization composition: C: 1.8 to 2.3, Si: not more than 1, Cr: 20 to 24, Mo: 0.5 to 2.6, Fe: the balance (in wt %)

Example 4: iron type material such as high speed tool steel subjected to a surface treatment by ion nitridation and further to a surface treatment by CrN

[ROLLER] cast iron material (to be referred to as E-3 hereinafter)

composition: T. C. (total carbon): 0.56 to 0.64, Si: 2.2 to 2.9, Mn: 0.6 to 1.0, P: 0.18 max, S: 0.08 max, Ni: 0.1 to 0.2, Cr: 0.20 max, Mo: 0.07 to 0.2, Ti: 0.25 max, Fe: the balance

[OIL] oils of A, B and C types shown in Tables 1 to 3 As a result, as shown in Table 4, the vane materials of Examples 1 to 4 are all good because they exhibit good results and higher durability than a combination of a conventional refrigerant R-22 and mineral oil (Mineral).

Figure 5:
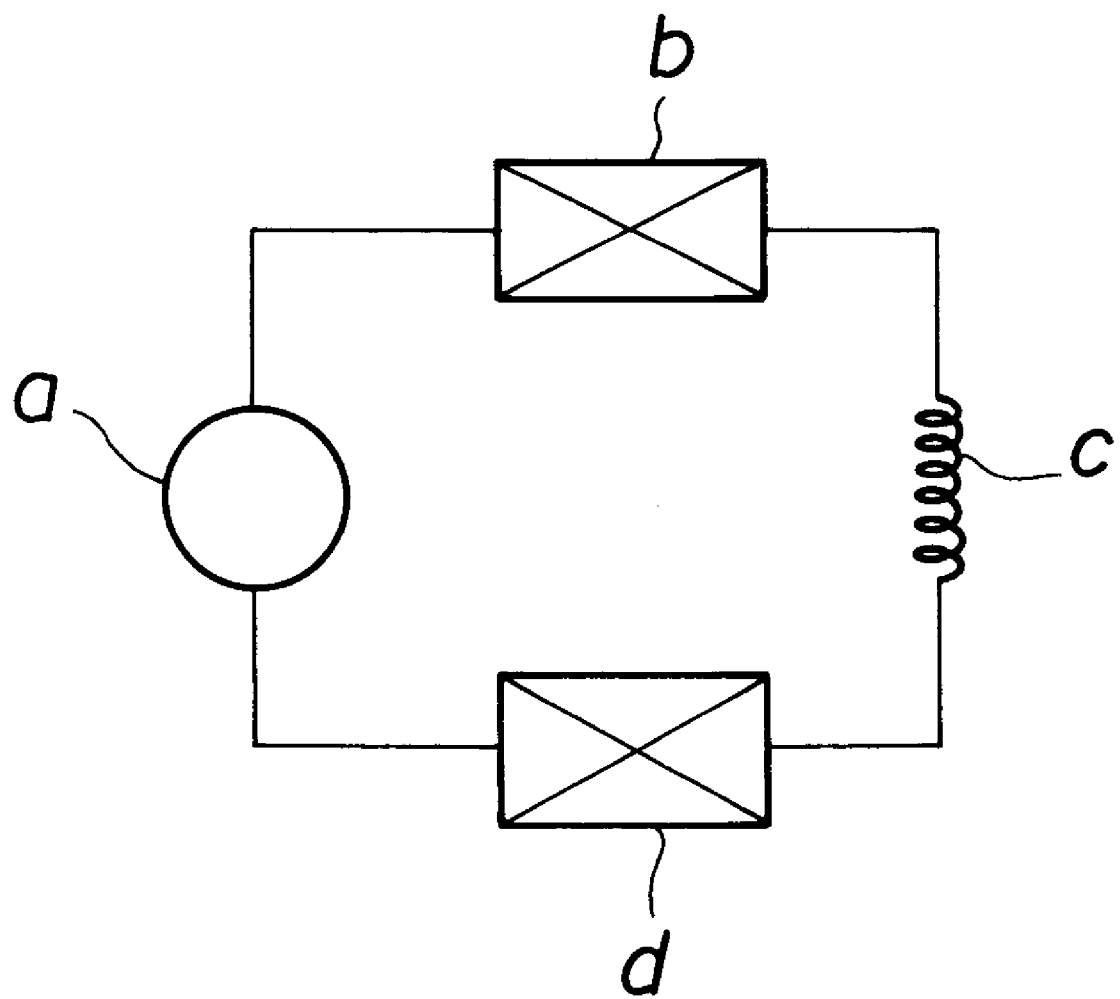
FIG. 5 is a refrigerant circuit diagram of a cooling apparatus according to the present invention.

As shown in FIG. 5, by connecting a refrigerant compressor a, condenser b, expansion device c and evaporator d by pipes and charging the above-mentioned HFC type refrigerant or mixture thereof (R134a, R410A, R404A or R407C) and the above-mentioned refrigerator oil (Type A, B, or C) having compatibility with the refrigerant into the hermetically sealed container 1 of the compressor a, there can be provided a cooling apparatus (such as a refrigerator, air conditioner or show case) which can prevent the returning of the oil and has a high refrigerating capacity.

TABLE 4

| Vane Material | Structure of Polyvinyl Ether (R4) | Refrigerant Used | Durability Test | | |
|---|---|---|---|---|---|
| | | | Wear | Sludge | TAN |
| Comparative Example | Type A | R134a | G | B | B |
| Example 1 | Type A | R134a | G | G | G |
| Example 2 | Type A | R134a | E | E | G |
| Example 3 | Type A | R134a | E | E | G |
| Example 4 | Type A | R134a | E | E | G |
| Comparative Example | Type C | R410A, R404A | G | B | B |
| Example 1 | Type C | R410A, R404A | G | G | G |
| Example 2 | Type C | R410A, R404A | E | E | G |
| Example 3 | Type C | R410A, R404A | E | E | G |
| Example 4 | Type C | R410A, R404A | E | E | G |
| Comparative Example | Type B | R407C | G | B | B |
| Example 1 | Type B | R407C | G | G | G |
| Example 2 | Type B | R407C | E | E | G |

TABLE 4-continued

| Vane Material | Structure of Polyvinyl Ether (R4) | Refrigerant Used | Durability Test | | |
|---|---|---|---|---|---|
| | | | Wear | Sludge | TAN |
| Example 3 | Type B | R407C | E | E | G |
| Example 4 | Type B | R407C | E | E | G |

*Note: E: excellent, G: good, B: bad

The following points have been found from the above results:

(1) Since the HFC type refrigerant does not contain chlorine atoms, it is inferior to CFC type and HCFC type refrigerants in the lubricity of a sliding portion.

(2) When the ratio of an alkyl group having 1 to 2 carbon atoms to an alkyl group having 3 to 4 carbon atoms in the structure of the polyvinyl ether oil is made a predetermined ratio in accordance with the type of the above HFC type refrigerant and a predetermined vane material is selected in accordance with the ratio, the polyvinyl ether oil does not separate when the separation temperature ranges from a high temperature side to a low temperature side, that is, from 35 to 10° C. Thereby, the refrigerator can exhibit a predetermined refrigerating capacity.

Stated specifically, the relationship between the structure of the polyvinyl ether oil and the separation temperature is shown in Table 5 below.

TABLE 5

The Relationship Between The Structure Of The Polyvinyl Ether Oil And The Separation Temperature
high-temperature side/low-temperature side (unit: ° C.)

| Structure of R4 (C1~C2/ C3~C4) | Type of Oil | Refrigerant | | | |
|---|---|---|---|---|---|
| | | R134a | R407C | R410A | R404A |
| 80~100/ 0~20% | Type D | 50 or more/ −50 or less | 50 or more/ −50 or less | 50 or more/ | 44/−50 or less |
| 80~100/ 0~20% | Type C | 50 or more/ −50 or less | 50 or more/ −44 | 50 or more/−23 | 37/−50 or less |
| 60~100/ 0~40% | Type B | 50 or more/ −20 | 50 or more/ −15 | --- | --- |
| 40~100/ 0~60% | Type A | 50 or more/ 10 | 50 or more/ −19 | --- | --- |

REMARKS: The mark "---" means that the separation occurs at entire temperature range.

The same function and effect are expected from the following vane materials as other examples.

For example, (1) composite material comprising aluminum and carbon and having the following composition composition: C: 55, Al: 36, Si: 6, others (such as Mg): 3 (in wt %)

(2) fiber reinforced aluminum alloy having the following composition composition: C: 55, Al: 36, Si: 6 (in wt %)

(3) ceramic such as zirconia (ceramic)

As described above, according to the present invention, thermal cracking caused by frictional heat generated by sliding members and the generation of sludge can be suppressed by a combination of a specific HFC type refrigerant, a polyvinyl ether type oil having a specific structure and a specific sliding material, and there is no carboxylic acid generated by hydrolysis when a conventional polyol ester type oil is used. As a result, a high-performance rotary compressor and cooling apparatus can be provided without the need for complicated process control.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A refrigerant compressor comprising a hermetically sealed container and a compressor unit installed in the hermetically sealed container, wherein an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula (1):

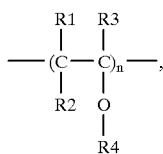
(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 40 to 100% and units in which R4 is an alkyl group having 3 to 4 carbon atoms are 0 to 60%.

2. The refrigerant compressor of claim 1, wherein the refrigerant is selected from the group consisting of 1,1,1,2-tetrafluoroethane (R134a), an azeotropic mixed refrigerant consisting of 50 wt % of difluoromethane (R32) and 50 wt % of pentafluoroethane (R125), and a pseudo-azeotropic mixed refrigerant consisting of 44 wt % of pentafluoroethane (R125), 52 wt % of trifluoroethane (143a) and 4 wt % of 1,1,1,2-tetrafluoroethane (R134a).

3. The refrigerant compressor of claim 1, wherein the refrigerator oil comprises 0.01 to 1.0 wt % of a phenolic antioxidant as an essential component and 0.01 to 2 wt % of an epoxy type or carbodiimide type compound.

4. The refrigerant compressor of claim 1, wherein the refrigerator oil comprises 0.1 to 2 wt % of a phosphoric ester type compound.

5. The refrigerant compressor of claim 1, wherein said compressor unit comprises a vane made from an iron type material or a carbon composite material infiltrated with aluminum and a roller made from an iron type material.

6. The refrigerant compressor of claim 1, wherein said compressor unit comprises a vane made from an iron type material such as high speed tool steel or an SUS type material subjected to a single or composite surface treatment by ion nitridation, nitrosulphurization or CrN.

7. A refrigerant compressor comprising a hermetically sealed container and a compressor unit installed in the hermetically sealed container, wherein an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula (1):

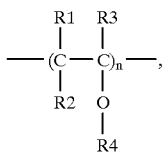
(1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 80 to 100% and units in which R4 is an alkyl group having 3 to 4 carbon atoms are 0 to 20%.

8. The refrigerant compressor of claim 7, wherein the refrigerant comprises at least two compositions selected from the group of fluorinated hydrocarbons represented by the following general formula (2):

$$C_l H_m F_n \quad (2)$$

(wherein when l=1, m=1~2, n=2~3 and m+n=4, when l=2, m=1~4, n=2~5 and m+n=6, and when l=3, m=1~3, n=5~7 and m+n=8).

9. The refrigerant compressor of claim 7, wherein the refrigerant is selected from the group consisting of an azeotropic mixed refrigerant consisting of 50 wt % of difluoromethane (R32) and 50 wt % of pentafluoroethane (R125), and a pseudo-azeotropic mixed refrigerant consisting of 44 wt % of pentafluoroethane (R125), 52 wt % of trifluoroethane (R143a) and 4 wt % of 1,1,1,2-tetrafluoroethane (R134a).

10. The refrigerant compressor of claim 7, wherein the refrigerator oil comprises 0.01 to 1.0 wt % of a phenolic antioxidant as an essential component and 0.01 to 2 wt % of an epoxy type or carbodiimide type compound.

11. The refrigerant compressor of claim 7, wherein the refrigerator oil comprises 0.1 to 2 wt % of a phosphoric ester type compound.

12. The refrigerant compressor of claim 7, wherein the compressor unit comprises a vane made from an iron type material or a carbon composite material infiltrated with aluminum and a roller made from an iron type material.

13. The refrigerant compressor of claim 7, wherein the compressor unit comprises a vane made from an iron type material such as high speed tool steel or an SUS type material subjected to a single or composite surface treatment by ion nitridation, nitrosulphurization or CrN.

14. A refrigerant compressor comprising a hermetically sealed container and a compressor unit installed in the hermetically sealed container, wherein an HFC type refrigerant or a mixture thereof and a refrigerator oil having compatibility with the refrigerant are charged into the hermetically sealed container, and the refrigerator oil essentially comprises a polyvinyl ether type compound having structural units represented by the following general formula (1):

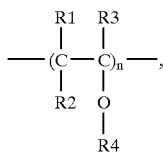
 (1)

wherein n is an integral number in the range of 1 or more, R1 to R3 are each a hydrogen atom or a hydrocarbon group having 1 to 8 carbon atoms and may be the same or different, R4 is an alkyl group having 1 to 4 carbon atoms, and units in which R4 is an alkyl group having 1 to 2 carbon atoms are 60 to 100% and units in which R4 is an alkyl group having 3 to 4 carbon atoms are 0 to 40%.

15. The refrigerant compressor of claim 14, wherein the refrigerant comprises at least two compositions selected from the group of fluorinated hydrocarbons represented by the following general formula (2):

$$C_l H_m F_n \tag{2}$$

(wherein when l=1, m=1~2, n=2~3 and m+n=4, when l=2, m=1~4, n=2~5 and m+n=6, and when l=3, m=1~3, n=5~7 and m+n=8).

16. The refrigerant compressor of claim 14, wherein the refrigerant is a pseudo-azeotropic mixed refrigerant consisting of 23 wt % of difluoromethane (R32), 25 wt % of pentafluoroethane (R125) and 52 wt % of 1,1,1,2-tetrafluoroethane (R134a).

17. The refrigerant compressor of claim 14, wherein the refrigerator oil comprises 0.01 to 1.0 wt % of a phenolic antioxidant as an essential component and 0.01 to 2 wt % of an epoxy type or carbodiimide type compound.

18. The refrigerant compressor of claim 14, wherein the refrigerator oil comprises 0.1 to 2 wt % of a phosphoric ester type compound.

19. The refrigerant compressor of claim 14, wherein the compressor unit comprises a vane made from an iron type material or a carbon composite material infiltrated with aluminum and a roller made from an iron type material.

20. The refrigerant compressor of claim 14, wherein the compressor unit comprises a vane made from an iron type material such as high speed tool steel or an SUS type material subjected to a single or composite surface treatment by ion nitridation, nitrosulphurization or CrN.

* * * * *